US012420353B2

(12) United States Patent
Tezawa

(10) Patent No.: US 12,420,353 B2
(45) Date of Patent: Sep. 23, 2025

(54) AIR BLOW NOZZLE AND TIP DRESSER EQUIPPED WITH AIR BLOW NOZZLE

(71) Applicant: KYOKUTOH CO., LTD., Aichi (JP)

(72) Inventor: Kazuhiro Tezawa, Aichi (JP)

(73) Assignee: KYOKUTOH CO., LTD., Aichi (JP)

( * ) Notice: Subject to any disclaimer, the term of this patent is extended or adjusted under 35 U.S.C. 154(b) by 541 days.

(21) Appl. No.: 17/799,565

(22) PCT Filed: Feb. 15, 2021

(86) PCT No.: PCT/JP2021/005412
§ 371 (c)(1),
(2) Date: Aug. 12, 2022

(87) PCT Pub. No.: WO2021/172063
PCT Pub. Date: Sep. 2, 2021

(65) Prior Publication Data
US 2023/0065846 A1 Mar. 2, 2023

(30) Foreign Application Priority Data
Feb. 27, 2020 (JP) .................................. 2020-031723

(51) Int. Cl.
B23K 11/30 (2006.01)
B23B 5/16 (2006.01)
(Continued)

(52) U.S. Cl.
CPC .......... B23K 11/3063 (2013.01); B23B 5/166 (2013.01); B23K 11/36 (2013.01);
(Continued)

(58) Field of Classification Search
CPC ....... Y10T 408/893; Y10T 409/304088; Y10T 409/304144; Y10T 409/3042;
(Continued)

(56) References Cited

U.S. PATENT DOCUMENTS 5,408,063 A * 4/1995 Onishi ................. B23H 11/003
219/69.11
6,106,203 A * 8/2000 Asmis ................ B23K 11/3063
409/137
(Continued)

FOREIGN PATENT DOCUMENTS

CN 101773892 A 7/2010
CN 106170364 A 11/2016
(Continued)

OTHER PUBLICATIONS

EPO Machine Translation of JP2001287046A—Asai, Y.; "Electrode Tip Dresser For Use In Resistance Welding, Includes Controller To Control Motor So That Multiple Positive Inversion Of Blade Is Performed In Single Cutting Time"; Oct. 16, 2001.*
(Continued)

Primary Examiner — Sunil K Singh
Assistant Examiner — Michael Vitale
(74) Attorney, Agent, or Firm — Ruggiero McAllister & McMahon LLC

(57) ABSTRACT

The air blow nozzle includes a nozzle body configured to be connected to an air compressor one end thereof and includes an air discharge portion another end thereof, the air discharge portion is capable of discharging compressed air supplied from the air compressor. The air discharge portion is configured to be movable to a position that does not correspond to an upper communication hole as the nozzle body is slid to one side. The nozzle body includes a nut configured to position the air discharge portion in a predetermined position near a rotary holder as the nozzle body is slid to another side.

4 Claims, 5 Drawing Sheets

(51) Int. Cl.
  *B23K 11/36* (2006.01)
  *B23Q 11/00* (2006.01)

(52) U.S. Cl.
  CPC ........ *B23Q 11/005* (2013.01); *B23Q 11/0067* (2013.01); *Y10T 409/304088* (2015.01); *Y10T 409/304144* (2015.01)

(58) Field of Classification Search
  CPC . Y10T 409/304256; B23B 5/166; B23C 3/12; B23C 3/122; B23K 11/3063; B23K 11/3072; B23K 11/312; B23Q 11/0042–11/0075
  USPC ............. 409/137, 138, 139, 140; 408/203.5; 219/119
  See application file for complete search history.

(56) References Cited

U.S. PATENT DOCUMENTS

| | | | |
|---|---|---|---|
| 6,666,631 B2* | 12/2003 | Yajima | B23K 11/3063 409/137 |
| 6,863,597 B2* | 3/2005 | Sunaga | B24B 55/06 451/454 |
| 9,707,639 B2 | 7/2017 | Nakajima | |
| 11,266,280 B2 | 3/2022 | Ohtsu et al. | |
| 2010/0143061 A1 | 6/2010 | Decker et al. | |
| 2016/0027973 A1* | 1/2016 | Maki | H10H 20/8316 438/26 |
| 2016/0279733 A1* | 9/2016 | Nakajima | B23Q 11/006 |
| 2020/0069123 A1 | 3/2020 | Ohtsu et al. | |
| 2020/0094346 A1* | 3/2020 | Kim | B23K 11/3063 |
| 2023/0017267 A1* | 1/2023 | Tezawa | B23K 11/36 |

FOREIGN PATENT DOCUMENTS

| | | | | |
|---|---|---|---|---|
| CN | 108296866 A | | 7/2018 | |
| CN | 109227135 A | | 1/2019 | |
| CN | 110640169 A | | 1/2020 | |
| DE | 19905478 A1 | * | 8/2000 | ......... B23K 11/3063 |
| EP | 1 797 986 A1 | | 6/2007 | |
| JP | 2001-287046 A1 | | 10/2001 | |
| JP | 2002361193 A | * | 12/2002 | |
| KR | 10-1464480 B1 | | 11/2014 | |
| KR | 102064543 B1 | * | 1/2020 | |
| WO | 2016/151623 A1 | | 9/2016 | |
| WO | WO-2018207397 A1 | * | 11/2018 | ......... B23K 11/3063 |

OTHER PUBLICATIONS

EPO Machine Translation of KR101464480B1—"Tip Dresser Cleaner"; Park et al.; Nov. 24, 2014.*
Korean Office Action dated Dec. 21, 2023 from corresponding Korean Patent Application No. 10-2022-7027383, 8 pages.
Chinese First Office Action dated Jan. 22, 2024 from corresponding Chinese Patent Application No. 202180012344.2, 7 pages.
International Search Report and Written Opinion dated Apr. 20, 2021 from corresponding International Patent Application No. PCT/JP2021/005412, 9 pages.
Extended European Search Report dated Dec. 23, 2022 from corresponding European Patent Application No. 21760132.7, 8 pages.

\* cited by examiner

AIR BLOW NOZZLE AND TIP DRESSER EQUIPPED WITH AIR BLOW NOZZLE

CROSS REFERENCE TO RELATED APPLICATIONS

This application is a U.S. National Stage Application under 35 U.S.C. § 371 of International Application No. PCT/JP2021/005412, filed Feb. 15, 2021, and claims the benefit of Japanese Patent Application No. JP 2020-031723, filed Feb. 27, 2020, the entire content all of which is hereby incorporated by reference in their entirety.

BACKGROUND OF THE DISCLOSURE

1. Field of the Disclosure

The present disclosure relates to an air blow nozzle configured to be attached to a tip dresser used for cutting a distal end of an electrode tip for spot welding, and to a tip dresser equipped with the air blow nozzle.

2. Description of the Related Art

In conventional automobile production lines, spot welding is extensively used for assembling a vehicle body. In spot welding, when a welding operation is repeated, an oxide film builds up on a distal end of an electrode tip, and the welding performed in such condition causes deteriorated quality of a welded portion. For this reason, it is necessary to cut periodically the distal end of the electrode tip using a tip dresser to remove the oxide film.

When chips produced upon cutting the distal end of the electrode tip by the tip dresser remain caught at a cutting blade used for cutting the electrode tip, the chips may impede a cutting operation.

To avoid this, for example, Patent document 1 discloses a tip dresser equipped with an air blow nozzle. The air blow nozzle includes a nozzle body secured to an outer surface of a housing case of the tip dresser, and connected to an air supply source at one end thereof and having an air discharge portion at another end thereof. The air blow nozzle is configured such that compressed air supplied from the air supply source is discharged from an air discharge port of the air discharge portion through a communication hole of the housing case of the tip dresser toward a cutting blade of a rotor disposed within the housing case, in order to remove chips sticking to the cutting blade.

CITATION LIST

Patent Literature

[Patent Document 1] International Patent Publication No. WO2016/151623

SUMMARY

When a cutting operation on an electrode tip by the tip dresser is repeated, the cutting blade of the rotor is worn out. Therefore, the rotor needs to be periodically removed from the communication hole of the housing case to the outside of the housing case to perform a maintenance operation on the cutting blade. In the case of the tip dresser equipped with the air blow nozzle as disclosed in Patent document 1, given the fact that the nozzle body of the air blow nozzle is located near the communication hole of the housing case, the nozzle body needs to be moved temporarily away from the communication hole of the housing case to facilitate the maintenance operation.

In this respect, once the nozzle body is moved away from the communication hole of the housing case to perform the maintenance operation, the nozzle body may not be located at the same position as a position before moving the nozzle body when an operator again places the nozzle body near the communication hole of the housing case. This may result in that the compressed air discharged from the air discharge portion cannot remove chips sticking to the cutting blade, after resuming the cutting operation.

The present disclosure is made in view of the foregoing and an object of the present disclosure is to provide an air blow nozzle that, even when the maintenance operation of the tip dresser is periodically performed, can unfailingly remove chips sticking to the cutting blade during a cutting operation after the maintenance operation.

To address the object, the present disclosure is characterized by devising to be able to move the nozzle body away from near the communication hole of the housing case during the maintenance operation and to move the air discharge portion of the nozzle body back to a predetermined position with good reproducibility after the maintenance operation.

Specifically, the present disclosure is directed to an air blow nozzle configured to be attached to a tip dresser, the tip dresser including a housing case, a rotary holder, and a cutting member, the housing case including a hollow part therein and a communication hole in communication with the hollow part, the rotary holder configured to be disposed in the hollow part such that the rotary holder is detachable through the communication hole and to be disposed rotatably about an axis of rotation extending along a center of a hole of the communication hole, the rotary holder including a curved recess corresponding to the communication hole and a penetrating part extending through along the axis of rotation, the cutting member configured to be attached to an inner face of the penetrating part, the tip dresser configured such that insertion of an electrode tip for spot welding into the curved recess through the communication hole in a state where the rotary holder is being rotated, allows a distal end of the electrode tip to be cut by the cutting member. The following solutions are then applied.

According to a first aspect of the present disclosure, the air blow nozzle includes a nozzle body and a support body, the nozzle body configured to be connected to an air supply source at one end thereof and including an air discharge portion at another end thereof, the air discharge portion capable of discharging compressed air supplied from the air supply source, the support body configured to be secured to an outer surface of the housing case and to support the nozzle body such that the nozzle body is slidable in a horizontal direction. The air discharge portion is configured to be movable to a position that does not correspond to the communication hole as the nozzle body is slid to one side. The nozzle body includes a positioning portion for positioning the air discharge portion in a predetermined position near the rotary holder as the nozzle body is slid to another side.

According to a second aspect of the present disclosure which is an embodiment of the first aspect, the air blow nozzle includes a biasing member configured to bias the nozzle body to slide the nozzle body to the other side.

According to a third aspect of the present disclosure which is an embodiment of the first or second aspect, the nozzle body is rod-shaped to extend horizontally, the support body includes a slider hole through which the nozzle body is slidably inserted, and the biasing member includes a coil spring wrapped around the nozzle body and being in contact with the air discharge portion at one end thereof and with the support body at another end thereof.

According to a fourth aspect of the present disclosure which is an embodiment of any of the first to third aspects, the air discharge portion includes an air discharge port being hole-shaped to extend straight downwardly to be open in a bottom surface of the air discharge portion or slit-shaped to extend along a center line of the nozzle body to be open continuously in a lower portion of an end face of the air discharge portion and the bottom surface of the air discharge portion.

According to a fifth aspect of the present disclosure, a tip dresser includes an air blow nozzle of any of claims 1 to 4, the housing case including a pair of the communication holes formed at opposing locations in a top surface and a bottom surface thereof, and a chip collection unit configured to be disposed under the housing case and to collect chips produced in the penetrating part during a cutting operation to fall downwardly through a lower communication hole of the housing case, wherein the chip collection unit includes a chip guiding member provided on one lateral side of a chip falling area that is located downwardly of the lower communication hole of the housing case, the chip guiding member including at one end thereof a chip collection port located corresponding to the chip falling area, and configured to be connected at another end thereof to a chip collector capable of collecting the chips; and an air discharge unit provided on another lateral side of the chip falling area, the air discharge unit configured to discharge compressed air towards the chip collection port.

In the first aspect, when the nozzle body is slid to the one side, the air discharge portion is located at a position that does not correspond to the communication hole of the housing case, and an operator thus can remove the rotary holder through the communication hole to perform a maintenance operation for the cutting member. After finishing the maintenance operation, the operator then reattaches the rotary holder to the hollow part of the housing case through the communication hole and thereafter slides the nozzle body to the other side to restore the air discharge portion to the predetermined position by means of the positioning portion. Thus, after the maintenance operation is performed, the position of the air discharge portion of the nozzle body with respect to the rotary holder does not vary, thus enabling the chips sticking to the cutter to be unfailingly removed in a cutting operation after the maintenance operation.

In the second aspect, the operator keeps the nozzle body in a state of being slid to the one side against biasing force of the biasing member to be able to remove the rotary holder through the communication hole to perform a maintenance operation for the cutting member, and the operator moves his/her hand off the nozzle body to allow the nozzle body to automatically slide to the other side by means of biasing force of the biasing member to restore the air discharge portion to the predetermined position. This prevents such an event that the operator forgets to return the air discharge portion of the nozzle body to the predetermined position after the maintenance operation and the compressed air discharged from the air discharge portion is not discharged toward the rotary holder after a cutting operation.

In the third aspect, the air blow nozzle has a simple structure and compact shape, thus reducing failure and enabling spaces around the air blow nozzle to be efficiently utilized.

In the fourth aspect, since the compressed air is discharged in at least one of a direction from above to below the rotary holder or a diagonal direction from above to below the rotary holder, the compressed air discharged from the air discharge portion smoothly passes through the penetrating part while being applied to the cutting member. Thus, the chips sticking to the cutting member can be efficiently removed.

In the fifth aspect, while part of the compressed air discharged from the air discharge unit is likely to enter into the housing case through the lower communication hole of the housing case and to pass upwardly through the penetrating part of the rotary holder, the compressed air discharged from the air blow nozzle prevents the compressed air discharged from the air discharge unit from passing upwardly through the penetrating part. Therefore, the chips produced in the penetrating part during the cutting operation can avoid moving, without falling down, upwardly off of the penetrating part due to the compressed air discharged from the air discharge unit. Thus, the chips can be unfailingly prevented from scattering from an upper communication hole of the housing case around the device.

DETAILED DESCRIPTION

Embodiments of the present disclosure are described in detail below with reference to the drawings. It is noted that the following description of preferred embodiments is merely an example in nature.

Figure 1:
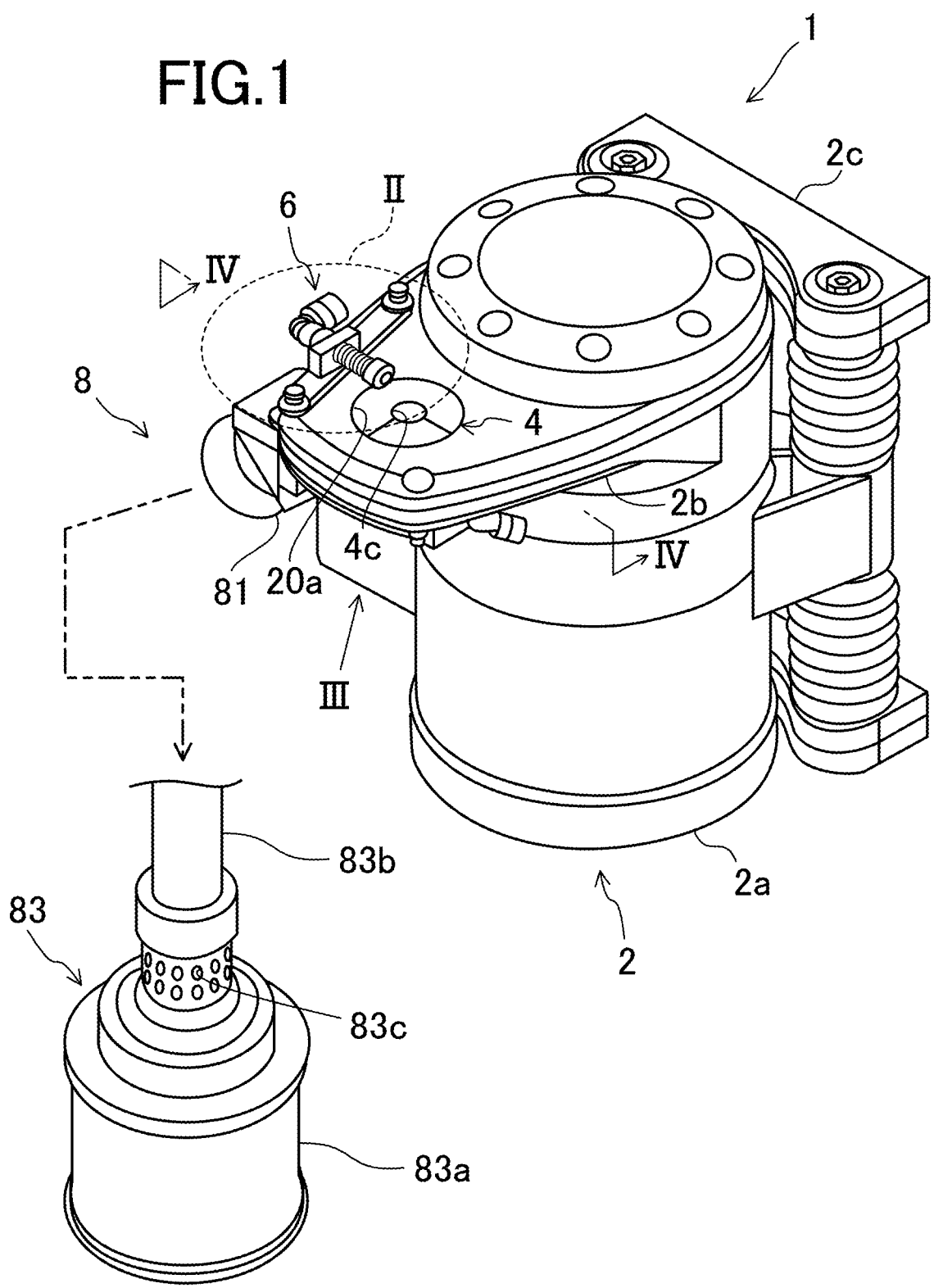
FIG. 1 is a perspective view illustrating a tip dresser to which an air blow nozzle according to embodiments of the present disclosure is attached.

FIG. 1 shows a tip dresser 1 according to an embodiment of the present disclosure. The tip dresser 1 is used for simultaneously cutting curved distal ends 10*a* of a pair of electrode tips 10 for spot welding (see FIG. 4), the electrode tips 10 being inserted onto respective distal ends of shanks G1 of a welding gun G to oppose one another. The tip dresser 1 includes a body case 2 (housing case) having a hollow part 20 therein and being generally L-shaped in the side view.

The body case 2 includes a bottomed cylindrical motor housing 2*a* for housing a drive motor (not shown), and a holder housing 2*b* extending laterally in a generally horizontal direction from an upper portion of the motor housing 2*a* and being generally in the shape of a tear drop in the planar view. A shock absorbing mechanism 2*c* for absorbing impact applied on the body case 2 is attached to a side surface of the motor housing 2*a* on a base end side of the holder housing 2*b*.

Figure 4:
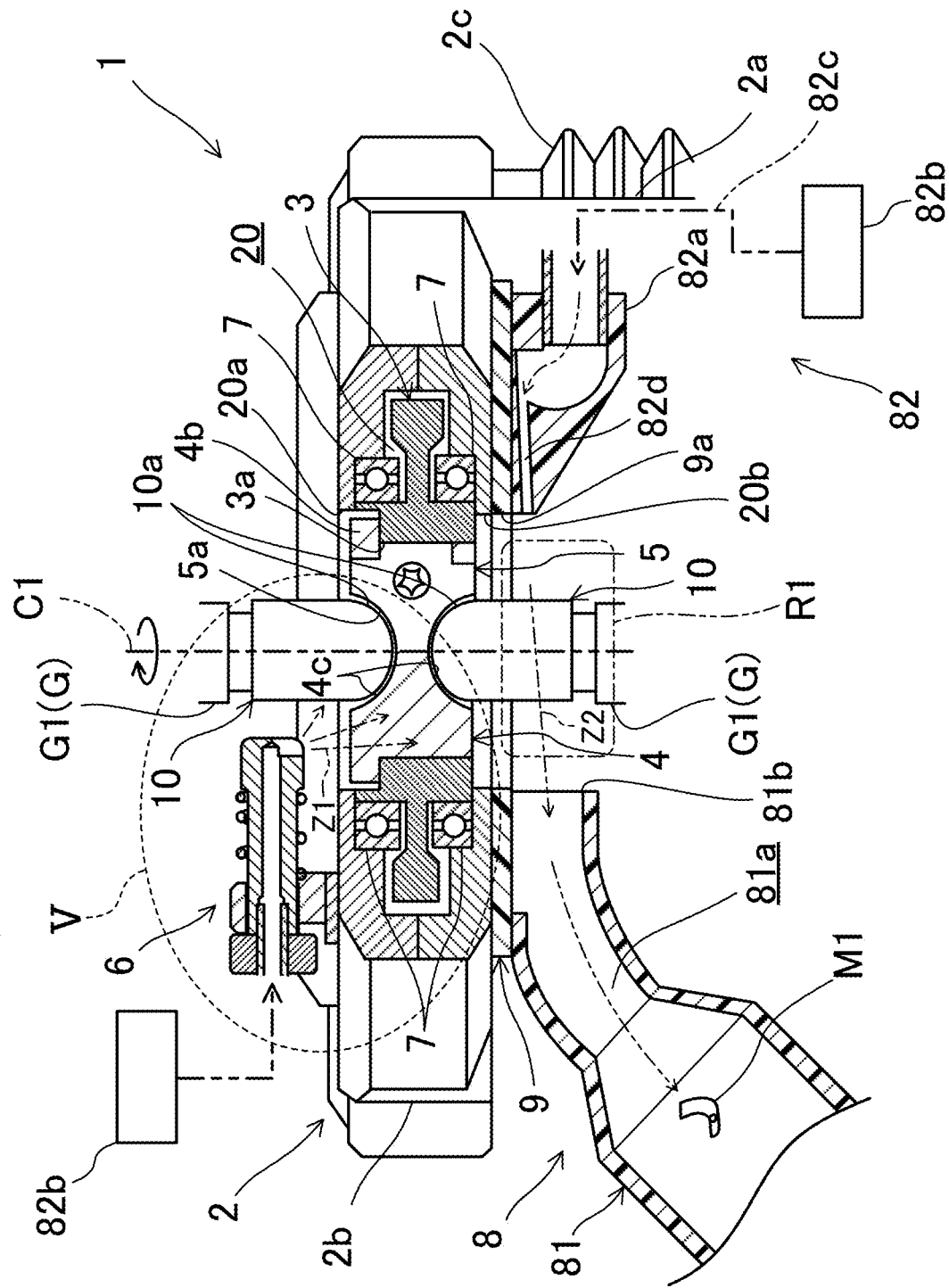
FIG. 4 is a cross-sectional view taken along a plane IV-IV indicated in FIG. 1.

As shown in FIG. 4, the holder housing 2*b* is in the shape of a plate having a substantial thickness. Upper and lower communication holes 20*a*, 20*b* opposing one another vertically and being in communication with the hollow part 20 are formed in a center of an extending portion of the holder housing 2b.

As shown in FIG. 4, a ring-shaped output gear 3 is located inside the holder housing 2b between the upper and lower communication holes 20a, 20b, and axially supported in the holder housing 2b such that the output gear 3 is rotatable about a vertically extending axis of rotation C1 via a pair of upper and lower bearings 7, and includes a mounting hole 3a extending therethrough vertically. The drive motor housed in the motor housing 2a is configured to drive in rotation the output gear 3 via a gear meshing mechanism (not shown).

A disk-shaped rotary holder 4 is mounted in the mounting hole 3a such that the rotary holder 4 is detachable through the upper communication hole 20a of the body case 2. The rotary holder 4 is configured to rotate together with the output gear 3 about the axis of rotation C1.

The rotary holder 4 is generally C-shaped in the planar view, and has a cutaway part 4a (penetrating part). The cutaway part 4a (penetrating part) progressively circumferentially expands around the axis of rotation C1 as the rotary holder 4 extends radially outwardly from the axis of rotation C1, so as to be open laterally outwardly and vertically.

The cutaway part 4a thus extends through along the axis of rotation C1.

A flange 4b extending laterally outwardly beyond other portions of the rotary holder 4 is formed on an upper peripheral edge of the rotary holder 4.

Furthermore, a pair of curved recesses 4c having a progressive decrease in diameter toward a center part of the rotary holder 4 are formed symmetrically along a direction of the axis of rotation C1 on respective top and bottom surfaces of the rotary holder 4. Each of the curved recesses 4c corresponds to associated one of the upper and lower communication holes 20a, 20b.

The curved recess 4c has a shape corresponding to the curved shape of the distal end 10a of the electrode tip 10 and allows the distal end 10a of the electrode tip 10 to be inserted in the state where a central axis of the electrode tip 10 is aligned with the axis of rotation C1.

A cutter 5 (cutting member) for cutting the distal ends 10a of the electrode tips 10 is attached to one of inner side surfaces of the cutaway part 4a extending laterally outwardly from the axis of rotation C1.

The cutter 5 includes a pair of cutting blades 5a extending along a direction intersecting with the axis of rotation C1 and formed symmetrically in the direction along the axis of rotation C1. The cutting blades 5a have a gently curved shape to correspond to the respective curved recesses 4c.

Then, as one of the pair of the electrode tips 10 opposing one another is inserted in an upper curved recess 4c through the upper communication hole 20a and another is inserted in a lower curved recess 4c through the lower communication hole 20b in the state where the rotary holder 4 is being rotated, the cutting blades 5a of the cutter 5 cut the respective distal ends 10a of the electrode tips 10.

Figure 3:
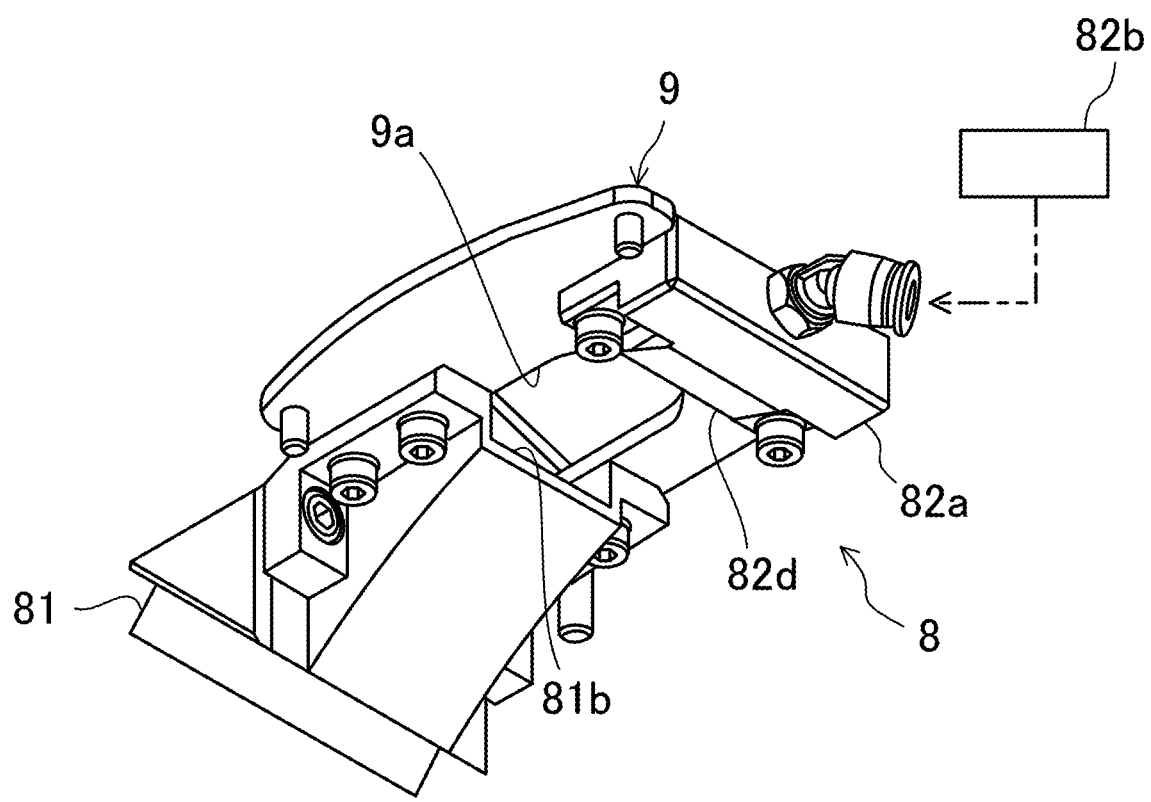
FIG. 3 is a fragmentary view taken in a direction of an arrow III indicated in FIG. 1.

As shown in FIGS. 3 and 4, a chip collection unit 8 for applying suction for chips M1 is attached to a bottom portion of the holder housing 2b of the body case 2 via a mounting bracket 9.

The chip collection unit 8 includes a chip guiding member 81 provided on one lateral side of a chip falling area R1 located downwardly of the lower communication hole 20b of the body case 2, an air discharge unit 82 provided on another lateral side of the chip falling area R1, and a chip collector 83 capable of collecting chips M1.

The chip guiding member 81 extends to curve gently such that the chip guiding member 81 is located progressively downwardly as extending away from the air discharge unit 82 in a horizontal direction. The chip guiding member 81 has a chip guiding passage 81a therein and the chip guiding passage 81a is configured to guide chips M1.

The chip guiding member 81 includes at one end thereof a wider rectangular chip collection port 81b located corresponding to the chip falling area R1 and being in communication with the chip guiding passage 81a. The chip guiding member 81 is connected at another end thereof to the chip collector 83.

The air discharge unit 82 includes an air nozzle 82a secured on a bottom surface of the mounting bracket 9 and an air compressor 82b (air supply source) for supplying compressed air to the air nozzle 82a.

The air nozzle 82a is in the shape of a block having a generally triangular shape in the front view to have a vertical width that becomes progressively narrower towards the chip guiding member 81.

The air nozzle 82a includes an air discharge port 82d on a chip guiding member 81 side thereof, the air discharge port 82d opposing the chip collection port 81b. The air nozzle 82a is connected on a side away from the chip guiding member 81 to a pipe 82c extending from the air compressor 82b. The compressed air supplied from the air compressor 82b is discharged toward the chip collection port 81b through the air discharge port 82d.

As shown in FIG. 1, the chip collector 83 includes a generally cylindrical storing box 83a capable of storing chips M1 inside the storing box 83a, and a connecting tube 83b configured to connect the storing box 83a and a downstream opening portion of the chip guiding member 81 to provide communication of the chip guiding passage 81a with an inside of the storing box 83a. A plurality of vent holes 83c for venting inside air into the outside are formed in a wall of a storing box 83a side of the connecting tube 83b.

The mounting bracket 9 is generally rectangular plate-shaped and includes an opening 9a corresponding to the lower communication hole 20b.

As shown in FIG. 1, an air blow nozzle 6 for discharging compressed air towards the rotary holder 4 through the upper communication hole 20a is placed in close proximity above the body case 2.

Figure 2:
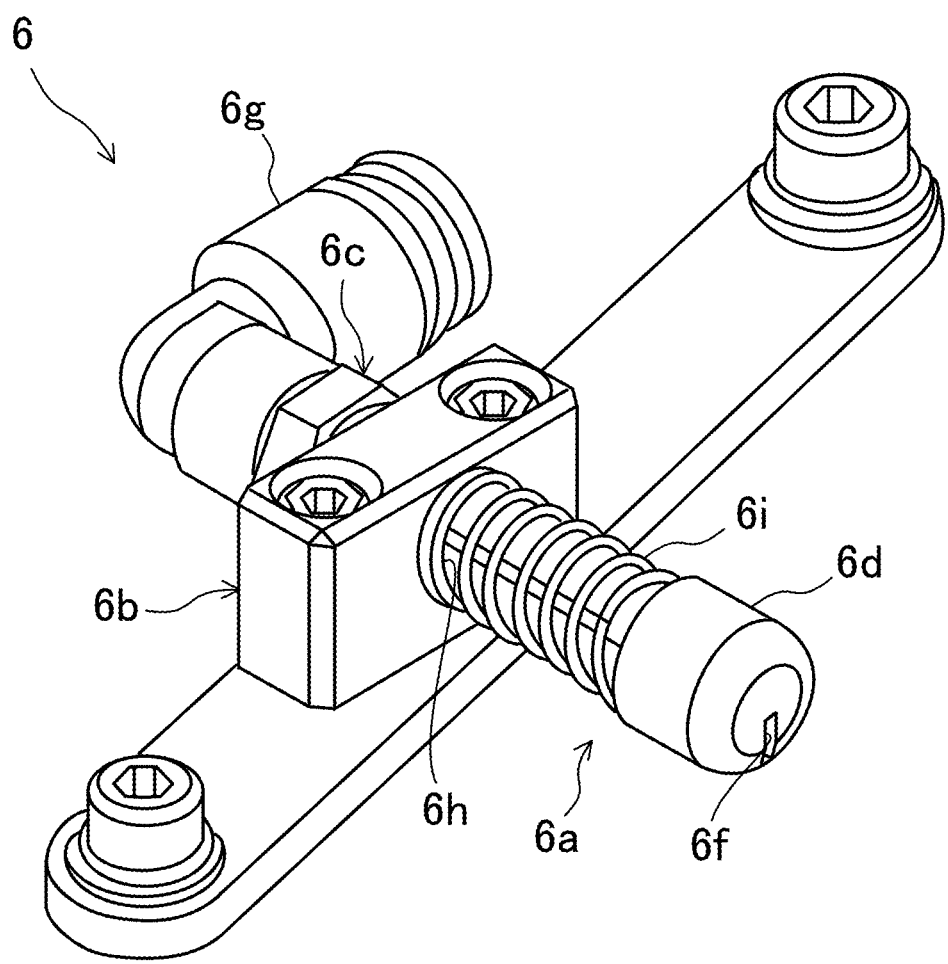
FIG. 2 is an enlarged view of a part II indicated in FIG. 1.

As shown in FIG. 2, the air blow nozzle 6 includes a generally cylindrical rod-shaped nozzle body 6a extending horizontally and a rectangular prism-shaped support block 6b (support body) secured on a top surface of the holder housing 2b at a location above the chip guiding member 81 and near the upper communication hole 20a. The nozzle body 6a is positioned to have its center line extending in a direction orthogonal to the axis of rotation C1 of the rotary holder 4.

Figure 5:
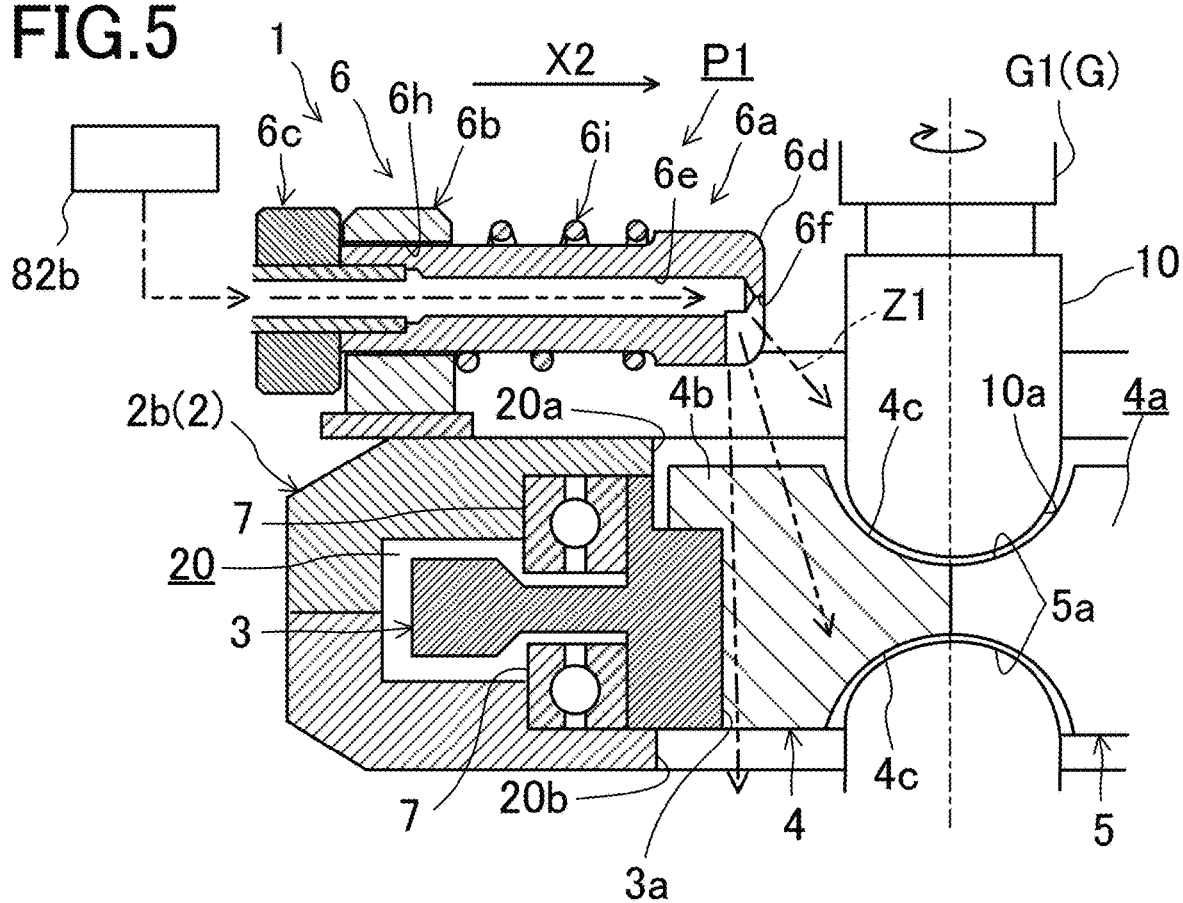
FIG. 5 is an enlarged view of a part V indicated in FIG. 4.
Figure 6:
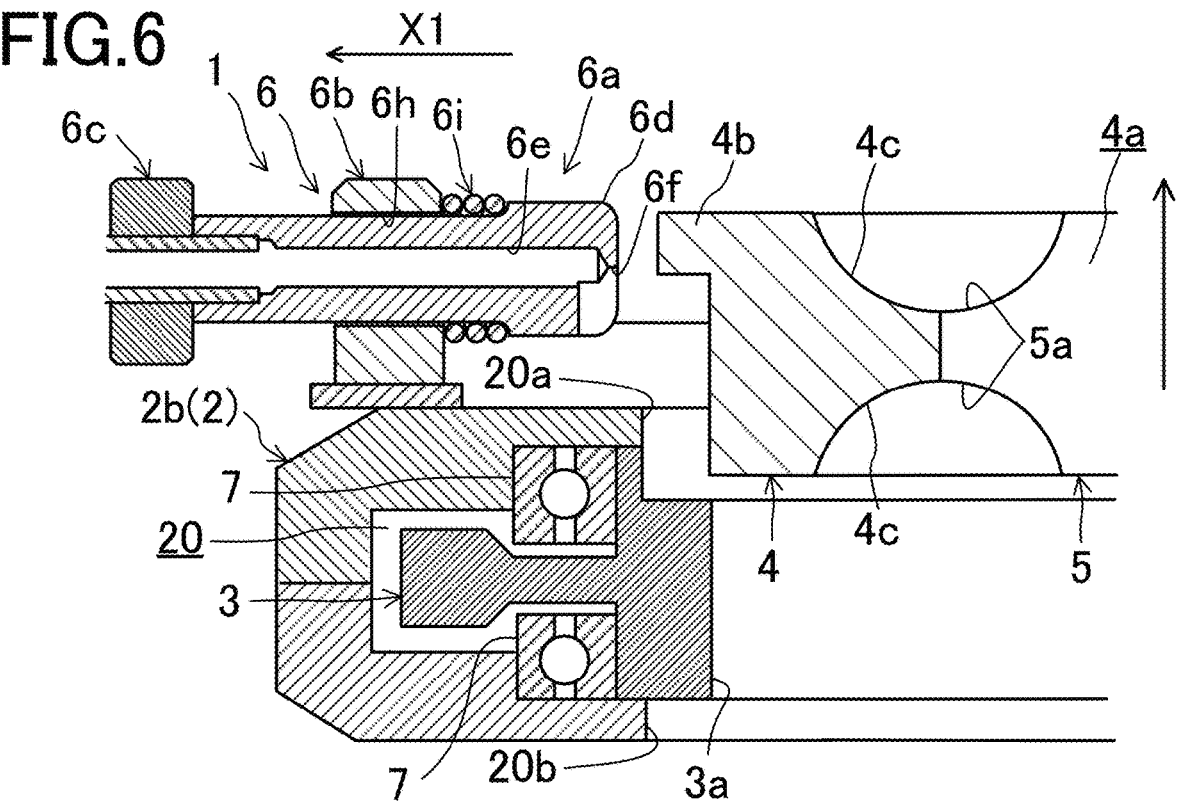
FIG. 6 is a corresponding view to FIG. 5 when a rotary holder is removed from a tip dresser.

As shown in FIGS. 4 to 6, a nut 6c (positioning portion) shaped to have an outer diameter larger than an outer diameter of a midsection of the nozzle body 6a is attached to one end of the nozzle body 6a and an air discharge portion 6d shaped to have an outer diameter larger than the outer diameter of the midsection of the nozzle body 6a is provided in another end of the nozzle body 6a.

The nozzle body 6a includes an air passage 6e inside the nozzle body 6a, the air passage 6e being open at one end and extending along the center line of the nozzle body 6a. Another end of the air passage 6e is located in the air discharge portion 6d.

The air discharge portion 6*d* includes an air discharge port 6*f* being continuous with the other end of the air passage 6*e*, and having a slit shape to extend a predetermined distance from an end portion (the other end) of the air discharge portion 6*d* along the center line of the nozzle body 6*a* in a lower half portion of the air discharge portion 6*d*, and being open continuously in a lower half portion of the end portion of the air discharge portion 6*d* and a bottom surface of an end portion side of the air discharge portion 6*d*.

The nozzle body 6*a* is then connected at the one end thereof to the air compressor 82*b* via an L-shaped pipe 6*g*. The compressed air supplied from the air compressor 82*b* can be thus discharged from the air discharge port 6*f* of air discharge portion 6*d*.

The support block 6*b* includes in a middle thereof a slider hole 6*h* extending through in a direction where the chip guiding member 81 and the air discharge unit 82 are arranged in parallel, and the midsection of the nozzle body 6*a* is slidably inserted through the slider hole 6*h*.

That is, the support block 6*b* supports the nozzle body 6*a* such that the nozzle body 6*a* is slidable in a horizontal direction.

As shown in FIG. 6, the air discharge portion 6*d* of the nozzle body 6*a* is configured to be movable to a position that does not correspond to the upper communication hole 20*a*, as the nozzle body 6*a* is slid to one side.

On the other hand, as shown in FIG. 5, the nut 6*c* attached to the nozzle body 6*a* is configured to contact the support block 6*b* to position the air discharge portion 6*d* in a predetermined position P1 near the rotary holder 4, as the nozzle body 6*a* is slid to another side.

A coil spring 6*i* (biasing member) is wrapped around the midsection of the nozzle body 6*a*. The coil spring 6*i* contacts the air discharge portion 6*d* at one end thereof and the support block 6*b* at another end thereof and is configured to bias the nozzle body 6*a* such that the nozzle body 6*a* is slid to the other side.

As shown in FIG. 4, when the distal ends 10*a* of the electrode tips 10 are then cut by the cutter 5 in the state where compressed air Z1 is continuously discharged from the air discharge port 6*f* of the air blow nozzle 6 towards the rotary holder 4 and compressed air is continuously discharged from the air discharge port 82*d* of the air nozzle 82*a* towards the chip collection port 81*b*, the chips M1, which are produced in the cutaway part 4*a* of the rotary holder 4 during a cutting operation on the electrode tips 10 by the cutter 5 and are pushed downwardly in the cutaway part 4*a* by the compressed air Z1 discharged from the air discharge port 6*f* to fall downwardly through the lower communication hole 20*b*, are pushed through the chip collection port 81*b* into the chip guiding passage 81*a* by the compressed air Z2 discharged from the air discharge port 82*d*, and are guided in the chip guiding passage 81*a* to be collected in the chip collector 83.

Next, a cutting operation on a distal end 10*a* of an electrode tip 10 performed by the tip dresser 1 is described in detail.

First, as shown in FIG. 4, the drive motor (not shown) of the tip dresser 1 is driven in rotation to rotate the output gear 3 to thereby rotate the rotary holder 4 about the axis of rotation C1.

The air blow nozzle 6 and the air nozzle 82*a* are also supplied with compressed air using the air compressor 82*b* to thereby discharge the compressed air Z1, Z2 from the air blow nozzle 6 and the air nozzle 82*a*, respectively.

Then, a pair of electrode tips 10 opposing vertically are moved to above and below the holder housing 2*b* respectively to align a central axis of each of the electrode tips 10 with the axis of rotation C1 of the rotary holder 4.

Subsequently, the electrode tips 10 are brought closer to one another. While upper one of the electrode tips 10 is inserted in the upper curved recess 4*c* of the rotary holder 4 through the upper communication hole 20*a* of the holder housing 2*b*, lower one of the electrode tips 10 is inserted in the lower curved recess 4*c* of the rotary holder 4 through the lower communication hole 20*b* of the holder housing 2*b*. The distal ends 10*a* of the electrode tips 10 are then cut by the cutter 5 attached to the rotary holder 4.

In the operation, the compressed air Z1 discharged from the air discharge port 6*f* of the air blow nozzle 6 passes downwardly through the cutaway part 4*a* of the rotary holder 4, and thereby chips M1 produced from the distal ends 10*a* of the electrode tips 10 unfailingly fall downwardly without remaining caught at the rotary holder 4. Thus, the chips M1 fall through the opening 9*a* of the mounting bracket 9 into the chip falling area R1 located downwardly of the lower communication hole 20*b*.

The chips M1 having fallen in the chip falling area R1 change their direction towards the chip collection port 81*b* due to the compressed air Z2 from the air nozzle 82*a* toward the chip collection port 81*b*, to enter into the chip guiding passage 81*a* through the chip collection port 81*b*.

That is, the compressed air Z2 discharged from the air nozzle 82*a* pushes the chips M1 having fallen in the chip falling area R1, into the chip guiding passage 81*a* through the chip collection port 81*b*.

In the operation, while part of the compressed air Z2 discharged from the air discharge port 82*d* of the air nozzle 82*a* is likely to enter into the body case 2 through the lower communication hole 20*b* and to pass upwardly through the cutaway part 4*a* of the rotary holder 4, the compressed air Z1 discharged from the air discharge port 6*f* of the air blow nozzle 6 prevents the compressed air Z2 discharged from the air nozzle 82*a* from passing upwardly through the cutaway part 4*a*. Therefore, the chips M1 produced in the cutaway part 4*a* during the cutting operation can be kept away from moving, without falling down, upwardly off of the cutaway part 4*a*, due to the compressed air Z2 discharged from the air nozzle 82*a*. Thus, the chips M1 can be unfailingly prevented from scattering from an upper opening portion of the cutaway part 4*a* around the device.

The chips M1 having entered into the chip guiding passage 81*a* from the chip collection port 81*b* then move to the chip collector 83 while being guided by the chip guiding passage 81*a*, and are collected in the chip collector 83.

Next, a maintenance operation of the cutter 5 in the tip dresser 1 according to the embodiment of the present disclosure is explained.

Once a cutting operation on an electrode tip 10 by the tip dresser 1 is performed predetermined times, an operator stops the drive motor of the tip dresser 1.

Next, the operator keeps the nozzle body 6*a* of the air blow nozzle 6 in a state of being slid to the one side against biasing force of the coil spring 6*i*. As shown with the arrow X1 in FIG. 6, the air discharge portion 6*d* of the nozzle body 6*a* is then located at a position that does not correspond to the upper communication hole 20*a* of the body case 2 and the operator thus can remove the rotary holder 4 through the upper communication hole 20*a* to perform a maintenance operation of the cutter 5.

When finishing the maintenance operation of the cutter 5, the operator reattaches the rotary holder 4 to the hollow part 20 of the body case 2 through the upper communication hole 20*a* in the state the nozzle body 6*a* of the air blow nozzle 6 is slid to the one side and thereafter, moves his/her hand off the nozzle body 6a. As shown with the arrow X2 in FIG. 5, the nozzle body 6a slides to the other side by means of the biasing force of the coil spring 6i to cause the nut 6c to contact the support block 6b, thereby allowing the air discharge portion 6d to automatically restore to the predetermined position P1.

Thus, since the air discharge portion 6d restores to the predetermined position P1 each time after the maintenance operation, the position of the air discharge portion 6d of the nozzle body 6a with respect to the rotary holder 4 does not vary, thus enabling the chips M1 sticking to the cutter 5a to be unfailingly removed in a cutting operation after the maintenance operation.

Since the air discharge portion 6d of the nozzle body 6a automatically restores to the predetermined position P1 by means of the biasing force of the coil spring 6i after the maintenance operation, such an event that the operator forgets to return the air discharge portion 6d of the nozzle body 6a to the predetermined position P1 after the maintenance operation and the compressed air Z1 discharged from the air discharge portion 6d is not discharged toward the rotary holder 4 after a cutting operation, can be avoided.

According to the embodiment of the present disclosure, the nozzle body 6a is slid with respect to the support block 6b and thereby, the maintenance operation is facilitated and the compressed air Z1 discharged from the air blow nozzle 6 can unfailingly strike the rotary holder after the maintenance operation.

The air blow nozzle 6 is then configured such that the coil spring 6i biasing the rod-shaped nozzle body 6a wraps around the nozzle body 6a, thus allowing the air blow nozzle 6 to have a simple structure and a compact shape. This reduces failure and enables spaces around the air blow nozzle 6 to be efficiently utilized.

Further, since the compressed air is discharged in at least one of a direction from above to below the rotary holder 4 or a diagonal direction from above to below the rotary holder 4, the compressed air Z1 discharged from the air discharge port 6f smoothly passes vertically through the cutaway part 4a while being applied to the cutter 5. Thus, the chips M1 sticking to the cutter 5 can be efficiently removed.

In the embodiment of the present disclosure, the compressed air Z1 discharged from the air discharge port 6f of the air blow nozzle 6 and the compressed air Z2 discharged from the air discharge port 82d of the air nozzle 82a is supplied from the same air compressor 82b; however, the compressed air may be supplied from different sources.

In the embodiment of the present disclosure, the air discharge port 6f of the air blow nozzle 6 then has a slit shape; however, the embodiment is not limited to this configuration and the air discharge port 6f of the air blow nozzle 6 may have a hole shape to extend straight downwardly.

In the embodiment of the present disclosure, the coil spring 6i is used as a mechanism for sliding the nozzle body 6a to the other side; however, other biasing members, such as other springs, rubber materials, and a structure for manually sliding the nozzle body 6a to the one and other sides can be used.

INDUSTRIAL APPLICABILITY

The present disclosure is suitable for an air blow nozzle used in a tip dresser for cutting a distal end of an electrode tip for spot welding, and for a tip dresser equipped with the air blow nozzle.

DESCRIPTION OF REFERENCE CHARACTERS

1 Tip Dresser
2 Body Case (Housing Case)
4 Rotary Holder
4a Cutaway Part (Penetrating Part)
4c Curved Recess
5 Cutter (Cutting Member)
6 Air Blow Nozzle
6a Nozzle Body
6b Support Block (Support body)
6c Nut (Positioning Portion)
6d Air Discharge Portion
6f Air Discharge Port
6h Slider Hole
6i Coil Spring (Biasing Member)
8 Chip Collection Unit
10 Electrode Tip
10a Distal End
20 Hollow part
20a Upper Communication Hole
20b Lower Communication Hole
81 Chip Guiding Member
81b Chip Collection Port
82 Air Discharge Unit
82a Air Compressor (Air Supply Source)
82d Air Discharge Port
83 Chip Collector
C1 Axis of Rotation
M1 Chips
R1 Chip Falling Area

The invention claimed is:

1. A tip dresser comprising:
   a housing case including a hollow portion, an upper communication hole formed in a top surface of the housing case, and a lower communication hole formed in a bottom surface of the housing case, the upper and lower communication holes being aligned with one another with respect to a first center line and the upper and lower communication holes being in communication with the hollow portion;
   a rotary holder configured to be disposed in the hollow portion and rotatable about an axis extending parallel to the first center line, the rotary holder being detachable through the upper communication hole, the rotary holder including a curved recess aligned with the upper and lower communication holes and a penetrating portion extending along the axis;
   a cutting member configured to be attached to an inner surface of the penetrating portion and configured to cut a distal end of an electrode tip for spot welding when the electrode tip is inserted through the upper and lower communication holes into the curved recess during rotation of the rotary holder;
   an air blow nozzle configured to discharge compressed air toward the rotary holder from above; and
   a chip collection unit configured to be disposed under the housing case and configured to collect chips produced in the penetrating portion during cutting that fall downward through the lower communication hole,
   wherein the air blow nozzle comprises a nozzle body, a support body, and a positioning portion,
   wherein the nozzle body is rod-shaped to extend horizontally and has a first end connectable to an air supply source and an opposing second end including an air discharge portion that is configured to discharge compressed air supplied from the air supply source, wherein the support body is configured to be secured to the top surface of the housing case and to support the nozzle body so that the nozzle body is slidable in a horizontal direction;

wherein the positioning portion is attached to the nozzle body and configured to position the air discharge portion;

wherein the air discharge portion is movable to a first position in which the air discharge portion is open to an upper region of the upper communication hole as the nozzle body is slid in the horizontal direction to one side, and to a second position in which the air discharge portion is positioned in a predetermined position above the rotary holder as the nozzle body is slid in the horizontal direction to another side, wherein the nozzle body has an air passage, the air passage being formed as a passageway through the nozzle body and the air passage having a longitudinal center line which is coincidental to a longitudinal center line of the nozzle body, and wherein the air discharge portion has a slit-shaped outlet which is an outlet for compressed air supplied through the air passage, the slit-shaped outlet extending radially outward from the longitudinal center line of the nozzle body and the slit-shaped outlet opening continuously in a lower portion of an end face of the air discharge portion and in a bottom surface of the air discharge portion.

2. The tip dresser according to claim 1, further comprising:

a biasing member configured to bias the nozzle body to slide the nozzle body to the predetermined position.

3. The tip dresser according to claim 2, wherein the support body includes a slider hole through which the nozzle body is slidably inserted; and wherein the biasing member includes a coil spring wrapped around the nozzle body and in contact with the air discharge portion at one end thereof and with the support body at another end thereof.

4. The tip dresser according to claim 1, wherein the chip collection unit includes a chip guiding member provided on one lateral side of a chip falling area that is located below the lower communication hole of the housing case, wherein the chip guiding member has a chip collection port at one end positioned to correspond to the chip falling area, and configured to be connected at another end thereof to a chip collector configured to collect chips, wherein the chip collection unit also includes an air discharge unit provided on another lateral side of the chip falling area, and wherein the air discharge unit is configured to discharge compressed air towards the chip collection port.

* * * * *